US007036030B1

(12) United States Patent
Altmejd (10) Patent No.: US 7,036,030 B1
(45) Date of Patent: Apr. 25, 2006

(54) COMPUTER SYSTEM AND METHOD OF USING TEMPERATURE MEASUREMENT READINGS TO DETECT USER ACTIVITY AND TO ADJUST PROCESSOR PERFORMANCE

(75) Inventor: Morrie Altmejd, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 581 days.

(21) Appl. No.: 10/072,480

(22) Filed: Feb. 7, 2002

(51) Int. Cl.
*G06F 1/06* (2006.01)

(52) U.S. Cl. ..................................... 713/322; 713/501
(58) Field of Classification Search ........ 713/300–324, 713/500, 501, 600, 601
See application file for complete search history.

(56) References Cited

U.S. PATENT DOCUMENTS

| | | | | |
|---|---|---|---|---|
| 5,379,230 A | * | 1/1995 | Morikawa et al. .......... 364/483 |
| 5,451,892 A | * | 9/1995 | Bailey ........................ 327/113 |
| 5,502,838 A | * | 3/1996 | Kikinis ....................... 395/550 |
| 5,590,061 A | * | 12/1996 | Hollowell et al. .......... 702/130 |
| 5,664,201 A | * | 9/1997 | Ikedea .................... 395/750.03 |
| 5,752,011 A | * | 5/1998 | Thomas et al. ............. 713/501 |
| 5,838,578 A | * | 11/1998 | Pippin ........................ 364/488 |
| 6,119,241 A | | 9/2000 | Michail et al. ............. 713/322 |
| 6,158,012 A | * | 12/2000 | Watts, Jr. ..................... 713/322 |
| 6,160,755 A | * | 12/2000 | Norman et al. ............. 365/233 |
| 6,311,287 B1 | * | 10/2001 | Dischler et al. ............ 713/601 |
| 6,336,080 B1 | * | 1/2002 | Atkinson .................... 702/132 |

\* cited by examiner

*Primary Examiner*—Dennis M. Butler
(74) *Attorney, Agent, or Firm*—Zagorin O'Brien Graham LLP (57) ABSTRACT

The present invention relates to a computer system and method of using temperature measurements in connection with a computer. In one embodiment, the method includes taking a temperature reading in connection with the computer, determining a desired operating temperature for the computer, comparing the temperature reading and the desired operating temperature to determine a temperature difference, and determining a user activity indication based on the temperature difference. In another embodiment, the system comprises a processor device having a clock input to receive a clock signal; a temperature measurement device responsive to the processor device, the temperature measurement device configured to take a temperature measurement for the processor device; and control logic responsive to the temperature measurement device. The control logic is to compare the temperature measurement to a desired operating temperature to determine a temperature difference. The clock signal applied to the clock input has a frequency that is increased when the temperature difference is positive.

18 Claims, 6 Drawing Sheets

COMPUTER SYSTEM AND METHOD OF
USING TEMPERATURE MEASUREMENT
READINGS TO DETECT USER ACTIVITY
AND TO ADJUST PROCESSOR
PERFORMANCE

BACKGROUND

1. Field of the Invention

The present invention relates generally to processors and computer systems and more particularly to a computer system and method of using temperature measurements to detect and to respond to user activity levels.

2. Description of the Related Art

Power management and power efficiency is an important feature for many types of modern computer systems. Power efficiency is especially important for mobile computers and other mobile devices that contain computer processors. For such systems, battery life is an important aspect of the usefulness of the device.

For example, a conventional notebook computer (also commonly referred to as laptop or portable computer) has power and thermal constraints that cause it to operate at performance states below an equivalent desktop computer.

Many power saving techniques have been introduced to try and mitigate the impact of thermal and battery power constraints. The frequency of operation (clock frequency) of the processor and its operating voltage determines its power consumption. Since power consumption and therefore heat generation are roughly proportional to the processor's frequency of operation, scaling down the processor's frequency has been a common method of staying within appropriate power limitations. Microprocessors utilized in mobile applications, i.e., those used in battery powered systems, are particularly sensitive to power considerations and therefore generally require the lowest supply voltage that can achieve the rated clock speed. That is in part due to the small, densely packed system construction that limits the ability of the mobile computer system to safely dissipate the heat generated by computer operation.

A common power management technique called "throttling" prevents the processor from over heating by temporarily placing the processor in a stop grant state. During the stop grant state the processor does not execute operating system or application code and typically has its clocks gated off internally to reduce power consumption. Throttling is an industry standard method of reducing the effective frequency of processor operation and correspondingly reducing processor power consumption by using a clock control signal to modulate the duty cycle of processor operation. A temperature sensor monitors the processor temperature to determine when throttling is needed. Throttling continuously stops and starts processor operation and reduces the effective speed of the processor resulting in reduced power dissipation and thus lowering processor temperature.

In addition, users of computer systems desire increased speed and operating performance as well as long battery life. The conventional throttling power management method has an undesirable effect of reducing processor performance by reducing the effective processor speed. Accordingly, there is a need for an improved system and method to address power management of computer systems.

SUMMARY

The present invention relates to a computer system and methods for use in connection with a computer. In one embodiment, the method includes taking a temperature reading in connection with the computer, determining a desired operating temperature for the computer, comparing the temperature reading and the desired operating temperature to determine a temperature difference, and determining a user activity indication based on the temperature difference. In another embodiment, the method comprises taking a temperature reading in connection with a computer, determining a desired operating temperature for the processor, comparing the temperature reading and the desired operating temperature to determine a temperature difference, and adjusting a voltage applied to a processor within the computer. The voltage applied is based upon the temperature difference.

In another embodiment, the method comprises taking a temperature reading in connection with the computer, determining a desired operating temperature in connection with the computer, comparing the temperature reading and the desired operating temperature to determine a temperature difference, and adjusting a clock signal applied to a processor within the computer. The clock signal is applied to the processor based upon the temperature difference.

In another embodiment, the system comprises a processor device having a clock input to receive a clock signal; a temperature measurement device responsive to the processor device, the temperature measurement device configured to take a temperature measurement for the processor; and control logic responsive to the temperature measurement device. The control logic is to compare the temperature measurement to a desired operating temperature to determine a temperature difference. The clock signal applied to the clock input has a frequency that is increased when the temperature difference is positive.

In another embodiment, the computing system includes a processor device having a clock input to receive a clock signal; an operating system that allows a user to select between a manual clock speed mode of operation and an automatic temperature-based mode of operation for the computing system; a temperature measurement device responsive to the processor device, the temperature measurement device configured to take a temperature measurement for the processor; and control logic responsive to the temperature measurement device. The control logic is to compare the temperature measurement with a predetermined desired operating temperature to determine a temperature difference. When the computer system is in the manual clock speed mode of operation, the clock signal applied to the clock input has a substantially constant frequency. When the computing system is in the automatic temperature-based mode of operation, the clock signal applied to the clock input has a frequency that is adjusted based on the temperature difference.

BRIEF DESCRIPTION OF THE DRAWINGS

The use of the same reference symbols in different drawings indicates similar or identical items.

DESCRIPTION OF THE DRAWING(S)

Figure 1:
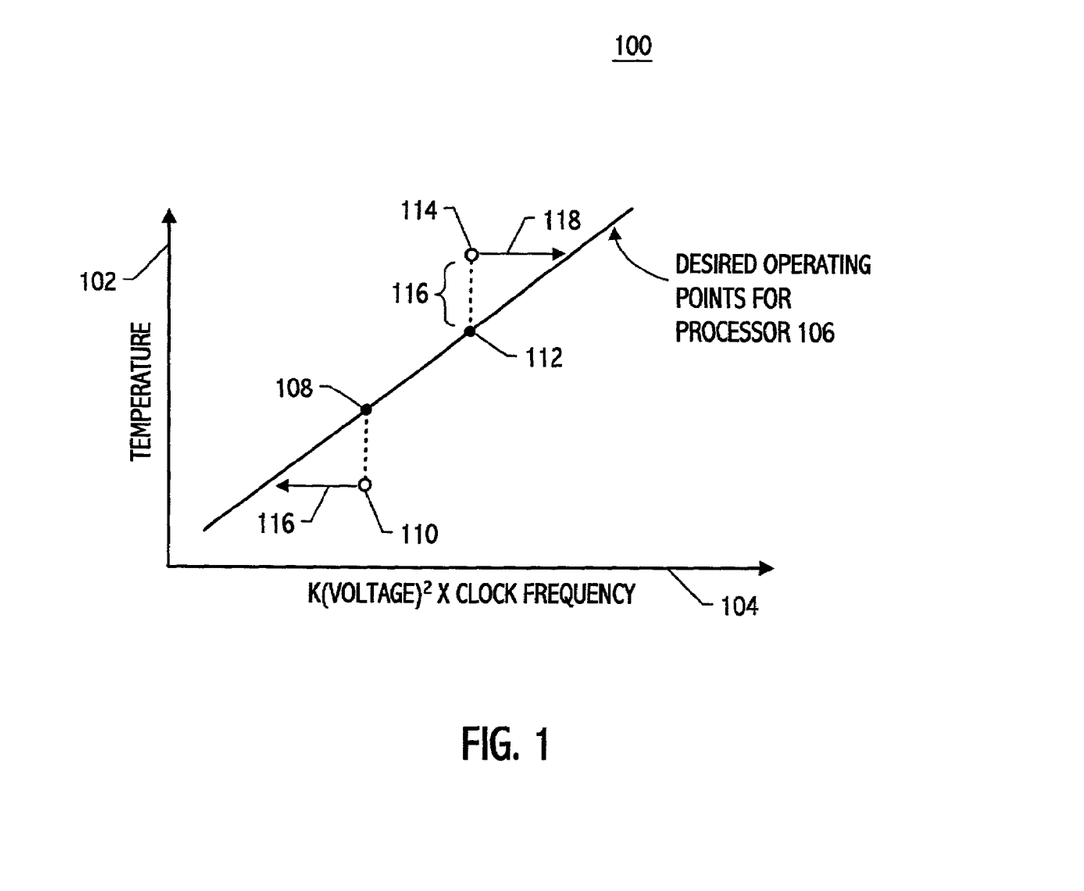
FIG. 1 is a general diagram that illustrates a relationship between a computer system's power and temperature related to the processor's voltage and frequency of operation.

Referring to FIG. 1, an illustrative graph 100 comparing temperature (or power) with respect to a computer processor's voltage and clock frequency is shown. The graph 100 has an X-axis 104 for the voltage and the clock frequency and a Y-axis 102 for the temperature measurement. While temperature is shown for convenience, a processor's power may be derived from that processor's temperature. The graph 100 illustrates a range of desired processor operating points 106 illustrated as a line. Along the range of desired operating point for the processor is a first desired operating point 108 and a second desired operating point 112. The first and second desired operating points are illustrative points along the line 106 based on a processor's current characteristics, namely its temperature (or power), voltage and frequency. The graph 100 also shows a first measured temperature reading 110 and a second measured temperature reading 114. The temperature difference between the second temperature reading 114 and the second desired operating point 112 is identified as temperature difference 116.

A goal during operation of the processor is to have the processor operate at a particular voltage and frequency based on the desired operating point for a current temperature. Thus, for the first and second measured points 110, 114, the processor's voltage and frequency should be adjusted as shown by the arrows 116, 118 to move the processor closer to the desired operating points. For measured points above the line 106, the processor has higher utilization than desired (e.g. a very active user or during processing of a very complex portion of a computer application), so the voltage and frequency of the processor should be increased to provide higher processor performance. For measured points below the line 106, the processor is operating at a lower level than desired (e.g. infrequent user activity on a laptop computer or a cell phone that is not being used), so the voltage and frequency of the processor should be decreased to save power.

Figure 2:
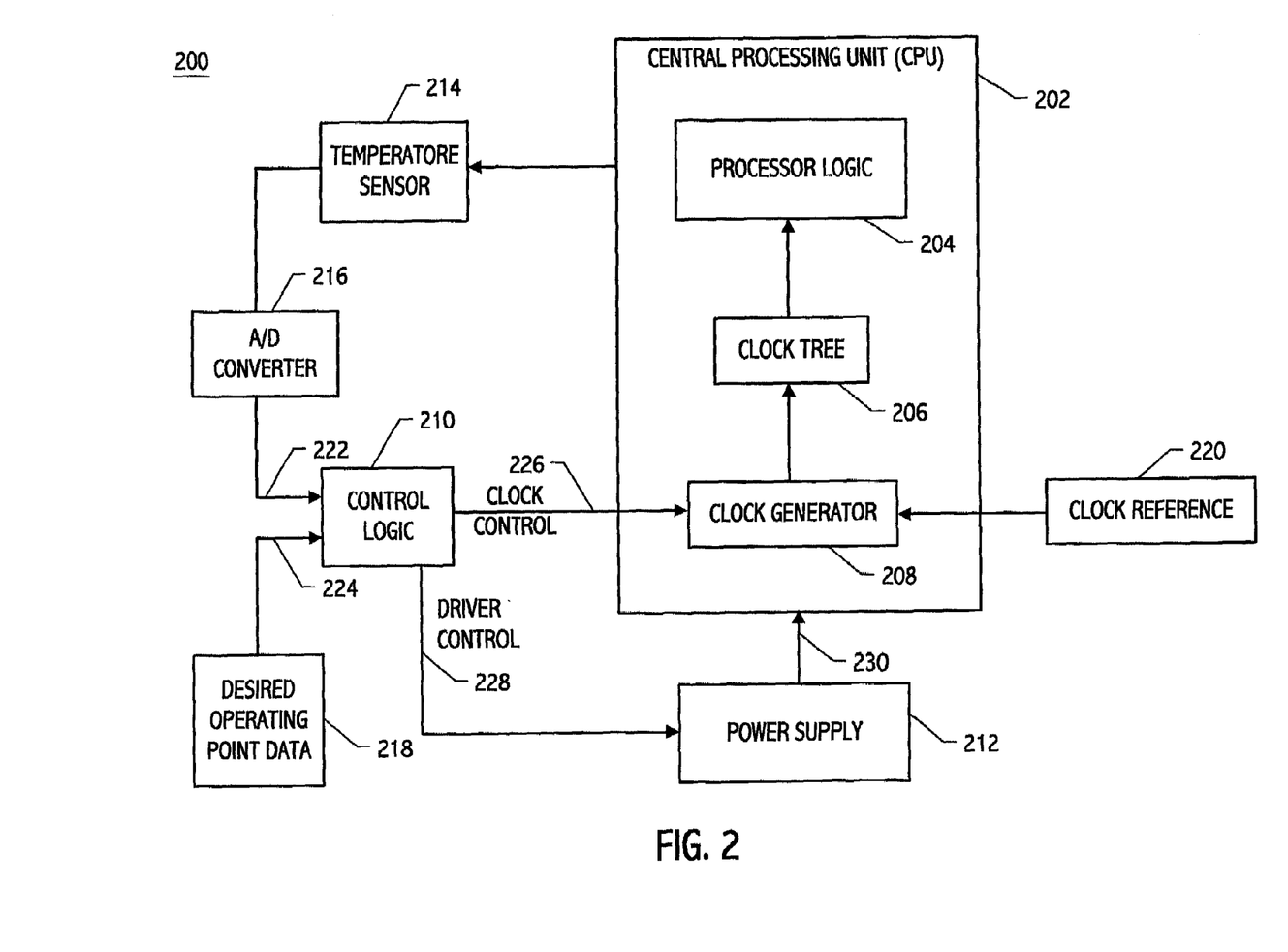
FIG. 2 is a block diagram that illustrates an embodiment of a system in accordance with the present invention.

Referring to FIG. 2, a block diagram of a computer system 200 is shown. The computer system 200 includes a central processing unit (CPU) 202, a temperature sensor 214, control logic 210, A/D converter 216, power supply 212, desired operating point data storage unit 218, and clock reference unit 220. The CPU 202 includes a processing logic module 204, a clock tree 206, and a clock generator 208. The clock generator 208 receives a clock reference signal from clock reference 220 and a clock control signal 226 from control logic 210. The CPU 202 receives an applied voltage signal 230 from the power supply 212. The power supply 212 modifies the voltage level of the applied voltage 230 based on a desired voltage indicated by the voltage/power control signal 228 from the control logic 210.

During operation, the temperature sensor 214 takes a temperature measurement reading for the CPU 202 and the measured temperature reading is converted from analog form to a digital reading by the A/D converter 216. The digital temperature reading 222 is then input to the control logic 210. The control logic has access to desired operating temperatures 224 from the data storage unit 218. The desired operating temperature may be retrieved from a look-up table or may be computed based on a specified formula or criteria. The desired operating temperature depends on the current voltage and frequency of the CPU 202. The control logic 210 compares the temperature reading 222 with the desired operating temperature 224. One method of making the comparison is to subtract the desired temperature 224 from the measured temperature 222 to form a temperature difference. The temperature difference provides an indication of the user activity level of the processor. In some applications, the temperature difference may optionally be compared to a threshold to determine if the temperature difference is large enough in comparison to the desired operating point, to make any processor operating changes. If the control logic determines that an operating change is desired, the control logic modifies the clock control signal 226 and the voltage control signal 228. The temperature sensor 214, A/D converter 216, and the control logic 210 may optionally be integrated together with and located on the die of the CPU 202.

Figure 3:
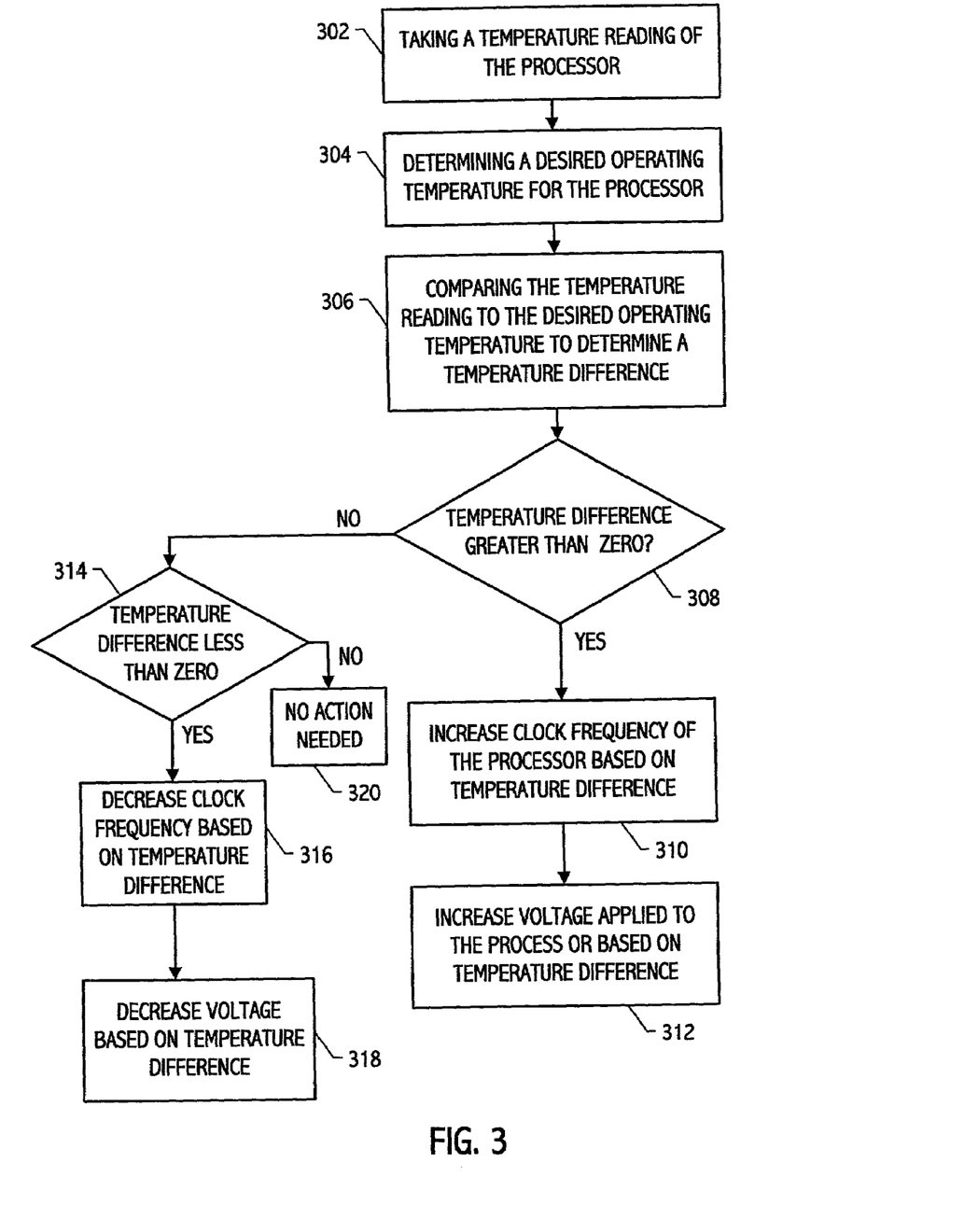
FIG. 3 is a flow chart that illustrates an embodiment of a method in accordance with the present invention.
Figure 4:
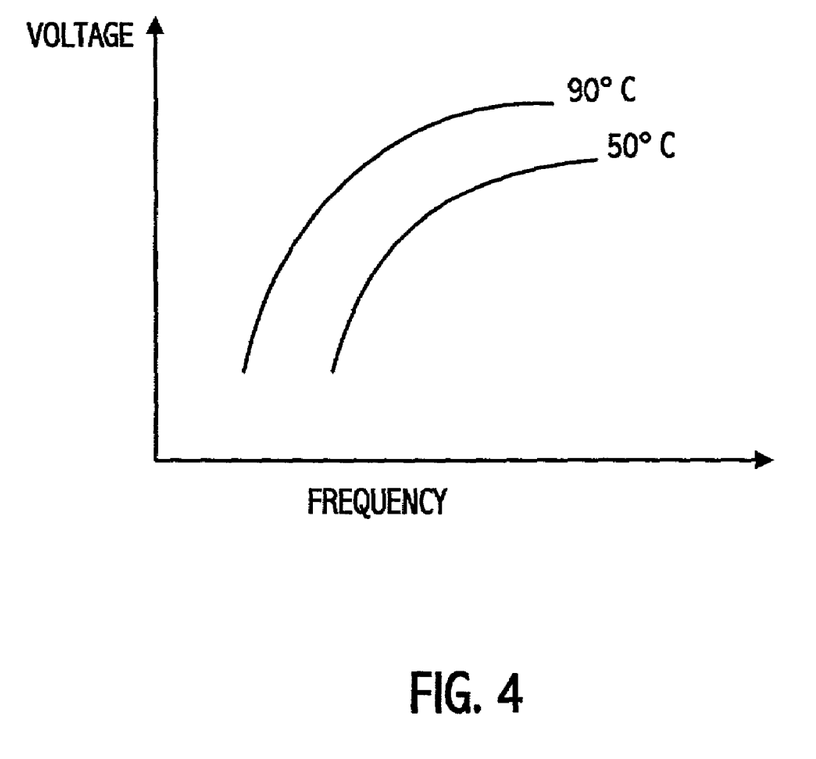
FIG. 4 is a general diagram that illustrates voltage and frequency characteristics of a processor.

Referring to FIG. 3, a method of detecting and responding to user activity for a processor is shown. A temperature reading of the processor is taken, at 302. The temperature reading may be a single temperature reading at a single point in time, or, to improve measurement accuracy, may be an average of several temperature readings of the processor temperature. A desired operating temperature for the processor is determined, at 304. The desired operating temperature may be retrieved from a memory, such as a lookup table, or may be determined based on a computation involving current voltage and frequency of the processor. In addition, since the characteristics of a semiconductor device, such as the processor, vary depending on the environment, the desired operating condition for the processor may be adjusted based on the temperature and other environmental variables. A general illustration comparing voltage and frequency characteristics with respect to temperature is shown in FIG. 4.

The measured temperature reading is compared to the desired operating temperature to determine a temperature difference, at 306. If the temperature difference is positive, i.e., greater than zero, then the clock frequency applied to the processor is increased, at 310, and the voltage applied to the processor is increased at 312. With a positive temperature difference, the method assumes that there is a high level of user activity and a need for more processing power. The performance and processing capability of the processor in this case will be increased.

If the temperature difference is negative, i.e., less than zero, then the clock frequency applied to the processor is decreased, at 316, and the voltage applied to the processor is decreased, at 318. In this situation, the negative temperature difference indicates a low level of user activity. Reducing the clock frequency and the voltage of the processor is to conserve power. Conserving power is particularly useful where the processor is within a mobile device, such as a portable computer. In one embodiment, the amount of the increase or decrease is based on the desired operating frequency and the desired voltage corresponding to the measured temperature. The desired increase or decrease in this case may be determined by a look-up operation or by computation. Another alternative is to increase or decrease the frequency and the voltage as a function of the size of the temperature difference. (i.e., larger clock and voltage adjustments for larger temperature differences). If the temperature difference is equal to zero, then no action is taken. After applying the voltage, at steps 312 and 318, or after determining that no action is needed, at 320, processing continues when a subsequent temperature reading is taken at 302. The temperature readings are typically made on a regular basis, (e.g., every 5 seconds), but may also occur on demand depending on the particular implementation.

For hardware based implementations, a timer can be set to trigger periodic temperature measurements and re-execution of the method shown in FIG. 3. For software implementations, a software timer, a polling method, or an interrupt mechanism are available techniques to allow periodic temperature measurement and temperature-based processor adjustment.

For a computer system implementation of the method shown in FIG. 3, it may be desirable to offer the computer user with an option as to whether to select a fixed clock frequency and voltage level so that the processor provides a substantially constant level of performance or to provide the automatic temperature-based mode of operation, where the temperature measurements and clock/voltage adjustments described herein are performed. For example, the operating system may be programmed to allow a user to select between a manual clock speed mode of operation and an automatic temperature-based mode of operation for the computing system. In this implementation, when the computing system is in the manual clock speed mode of operation, the clock signal applied to the clock input has a substantially constant frequency and when the computing system is in the automatic temperature-based mode of operation, the clock signal applied to the clock input has a frequency that is adjusted based on the temperature difference. Similarly, in the manual mode of operation, the voltage is held at a substantially constant level. When the computing system is in the automatic temperature-based mode of operation, the voltage level for the processor is adjusted based on the periodic temperature difference determinations.

Figure 5:
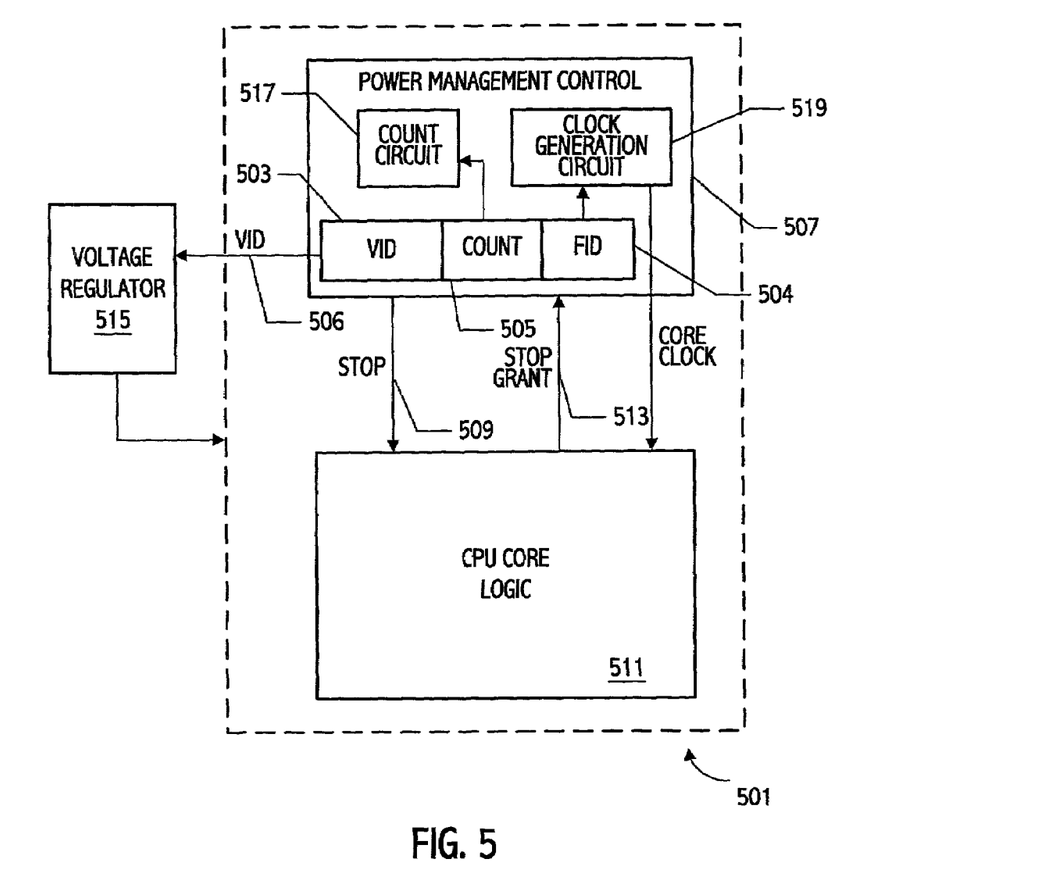
FIG. 5 is a block diagram of another embodiment of a computer system.

Referring to FIG. 5, another illustrative implementation for adjusting the clock frequency and the voltage of a processor is shown. More specifically, a processor is shown that can dynamically adjust its operating voltage and frequency to provide better thermal and power management. Processor 501 includes a programmable voltage ID (VID) field 503, core clock frequency control field (frequency ID (FID)) 504 and count field 505. Those fields may be located in one or more programmable registers. When the processor and/or system, determines that a change to the operating voltage and/or frequency is desired to increase or decrease the performance state (such as by using control logic 210 and the method described with respect to FIG. 3), the desired frequency and voltage control information are loaded into FID field 504 and VID field 503, respectively. Access to a register containing those fields, or an access to another register location, or access to a particular field in one of those registers can be used as a trigger to indicate that the processor should enter a stop grant state in which execution of operating system and application code is stopped. The access may result from, e.g., execution of a processor read or write instruction and in response to that access, power management control logic 507 supplies a stop signal 509 or other indication to indicate to CPU core logic 511 that the CPU core should stop execution of operating system and application code in order to enter a stop grant state.

Depending upon the processor implementation, stop signal 509 causes the processor to finish executing the current instruction, complete any current bus transactions and leave the host bus in an appropriate state or take any other necessary action prior to stopping code execution. Once the processor has completed all necessary preparations to enter the stop grant state, which vary depending on processor implementation, CPU core logic 511 supplies an asserted stop grant signal 513 or other indication to indicate to power management control logic 507 that CPU core logic 511 has entered the internally generated stop grant state. Note that while an internally generated stop grant state is described, other embodiments may utilize an externally generated stop grant state.

During the stop grant state, the processor can transition the voltage and frequency to the new states specified in VID field 503 and clock frequency control field 504. In some processor implementations, the processor core clocks are stopped after the processor enters the stop grant state. In other processor implementations, the processor core clock frequency is reduced to a frequency which can safely tolerate desired voltage changes.

In one implementation clock control frequency information is supplied as multiplier values for a clock that is supplied to processor 501. Those of skill in the art appreciate that many other approaches can be used to specify the core operating frequency.

In either case, the voltage control information specified in VID field 503 is supplied to voltage regulator 515 which in turn supplies CPU core logic 511 with the new voltage during the stop grant state.

Because changing the voltage and frequency can not be done instantaneously, the stop grant state needs to be maintained for a period of time to allow the new voltage and clock frequency to stabilize. In one embodiment, that time period is controlled through count circuit 517. Count circuit 517 begins counting once stop grant signal 513 is asserted, that is, once the stop grant state begins. The count circuit 517 is designed to count a sufficient amount of time for the voltage and frequency changes to stabilize. In one embodiment, as illustrated in FIG. 5, that time period is programmable through count register 505, which specifies the duration of the stop grant state. Once count circuit 517 has counted to the desired count value, the power management control logic 507 causes stop signal 509 to be de-asserted, which indicates to CPU core logic 511 that it should exit the stop grant state. On exiting the stop grant state, CPU core logic 517 resumes executing operating system and application code.

In some processor implementations, CPU core logic 517 may resume executing code at the new clock frequency immediately on exiting the stop grant state. In other implementations, for example, when CPU core logic executes at a reduced clock speed during the stop grant state, clock generation logic 511 may increase the core clock speed in increments up to the newly specified operating frequency after exiting the stop grant state and the CPU core may resume execution of operating system and application code after the core clock speed is at the specified operating frequency. In one embodiment, it takes on the order of 100–200 microseconds to change the processor performance.

Figure 6:
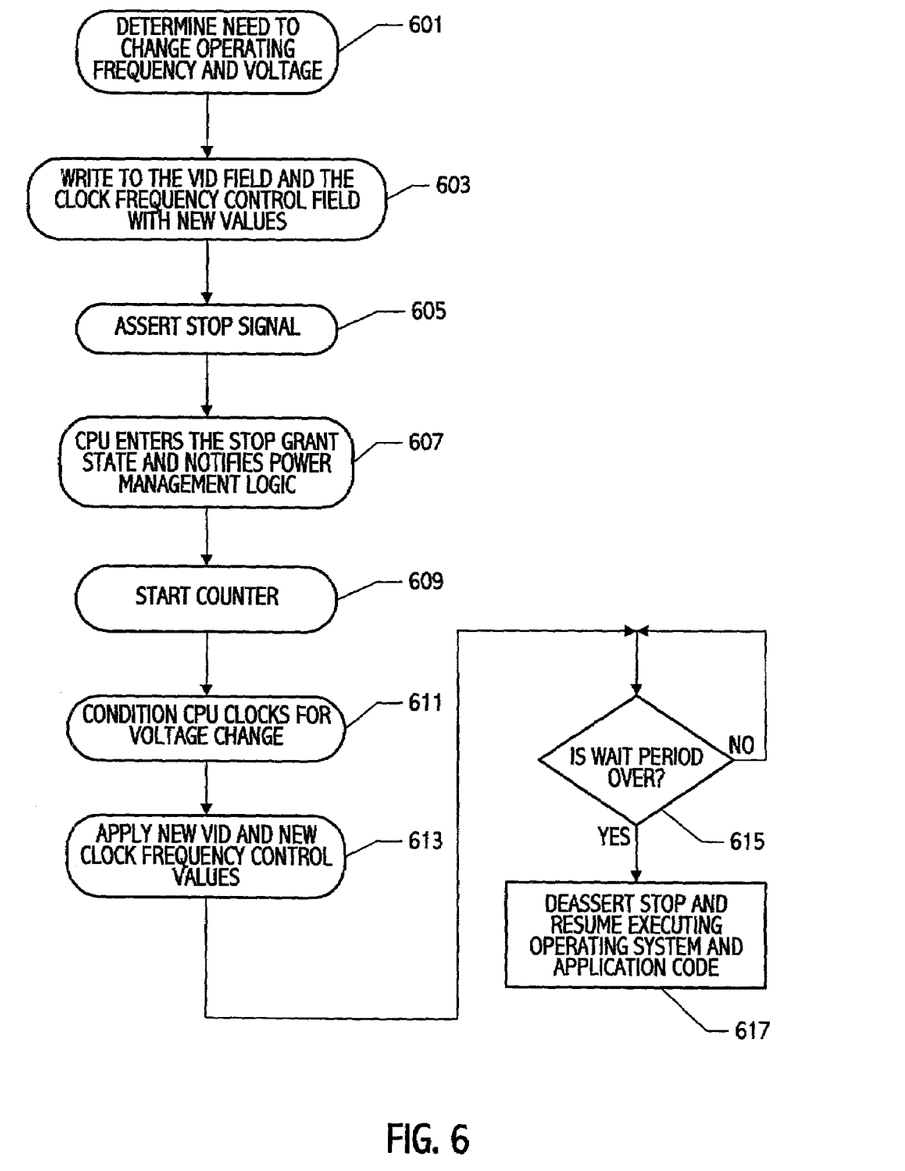
FIG. 6 is a flow chart that illustrates operation of the computer system of FIG. 5.

Referring to FIG. 6, the high level operation of processor 501 in accordance with one embodiment of the invention is described. At 601, the processor (or external logic or system) determines there is a need to change operating frequency and voltage to enter a new performance state. The processor then writes desired voltage and frequency values to VID field 203 and FID field 204. The fields may be located in one or more specific registers. In addition to writing fields 203 and 204, if necessary, the processor can write to count field 205 to specify the duration of the stop grant state. An access to a register containing those fields (or a read or write access to another register or an instruction) may be used as an indication to begin the process of entering the stop grant state.

In one particular embodiment, the VID/FID fields are located in a single register. Note that it is generally preferable to reduce the number of register I/O accesses, in order to get the desired result. In addition, it is preferable to build the contents of a control register using the register itself as opposed to building the various control fields in memory and then transferring the fields to the control register. In a typical register, any I/O write to the register causes a change in the control state of the machine. That is, a write to the VID/FID register would initiate the stop grant state sequence. Thus, one could not build the register bit-field by bit-field since each write to a bit-field would result in a change to the machine control state. It is potentially advantageous to modular software to have a register that does not begin a control sequence each time any one of its fields is accessed. If a different function is used to build each bit field, then a register whose access to any field causes a control state change would require a shared memory buffer between all functions so that each piece of modular software could build its portion of a bit field for the register in question. The shared memory buffer would be an additional overhead for each function.

In one embodiment, given a register that has several bit fields defined, one of the bit fields serves a dual purpose of both holding some useful control information and serving as the trigger to actually change the state of the underlying hardware. All other bit fields in the register can be read and written without causing the hardware to change state. That is, the FID/VID control register only causes a stop grant state when one of the FID or VID fields is written or otherwise accessed. A write to other bit fields does not initiate a performance state change.

Referring again to FIG. 6, once that trigger indication is received, and the CPU core logic receives a request to enter the stop grant state at 605, the CPU takes the necessary actions to place the CPU in the stop grant state (e.g., completing instructions and/or bus cycles) and then asserts stop grant signal 513 to power management control logic 507, at 607, to indicate that the CPU has entered the stop grant state.

The asserted stop grant signal from CPU core 513 causes the count circuit 517 to begin counting, at 609. The count circuit 517 determines the duration of the stop grant state. Note that writing to the count field 505 may be omitted under certain circumstances. For example, the count circuit may be hard coded to wait a sufficient time for the new voltage and frequency values to stabilize. Alternatively, the count field may maintain its previous value and thus only has to be written once. In any case, once in the stop grant state, CPU clocks are stopped or reduced by clock generation circuit 519 to condition the CPU clocks, at 611, to permit the desired voltage changes.

During the stop grant state, the new VID values are applied to voltage regulator 515 and the new clock frequency control values are supplied to clock generation circuit 519, at 613. Clock generation circuit 519 typically includes a phase locked loop (PLL) and the circuit takes some time to lock in to the new frequency. Even if the PLL is generating a stable new clock at the desired frequency, the CPU core is still getting either no clock or a divided down clock as the voltage stabilizes. After the count has expired, i.e., the waiting period, at 615, is determined to be over, power management control logic 507 de-asserts its stop signal and the CPU core logic 511 resumes executing code, at 617. Note that the latency involved in switching to a new performance state can be on the order of 200 microseconds.

Changing both voltage and frequency to enter a new performance state can be particularly effective. Changes in the processor's core clock frequency have an approximately linear affect on the power dissipated by the processor. Thus, a 20% reduction in clock frequency reduces the power dissipated by the processor by 20%. The range of change is significant since a ratio of lowest frequency to highest frequency is usually greater than 2:1. Consequently, the processor's power may be changed by a similar ratio. Changes in the processor's core voltage have an approximately square law effect. Potential power savings is proportional to the square of the percentage of voltage reduction. Although the range of change of voltage is generally less than 50%, the square law effect results in significant changes in the processor's power if the core voltage of the processor is reduced.

Thus, there has been described herein illustrative embodiments of a computer system and method of using temperature measurements to detect and to respond to user activity levels. It will be apparent to those skilled in the art that the disclosed subject matter may be modified in numerous ways and may assume many embodiments other than the preferred illustrative form specifically set out and described above. For example, while the control logic 210 has been shown external to the CPU 202, the control logic 210 may be implemented within the CPU 202. In such an internal logic implementation, the CPU 202 could allocate special-purpose control registers that may be programmed to adjust the clock frequency and/or the voltage level of the CPU 202. In such an implementation, the desired operating point data storage module could also be implemented within memory internal to the CPU 202. As another example, the control logic unit 210 may be implemented in hardware logic or may be implemented in software.

Accordingly, the above disclosed subject matter is to be considered illustrative and the appended claims are intended to cover all such modifications and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of detecting user activity of a computer, the method comprising:
    comparing a temperature reading of the computer and a desired operating temperature for the computer to determine a temperature difference;
    determining a user activity indication based on the temperature difference; and
    increasing a clock signal frequency utilized by a processor within the computer as a function of the temperature difference if the determined user activity indication indicates that user activity has increased.

2. The method of claim 1 further comprising increasing the clock signal frequency utilized by a processor within the computer as a function of the temperature difference if the determined user activity indication indicates that user activity is high.

3. A system comprising:
    a temperature measurement device configured to take a temperature measurement of a processor; and
    control logic responsive to the temperature measurement device, the control logic to compare the temperature measurement to a desired operating temperature to determine a temperature difference of the temperature reading from the desired operating temperature, wherein the clock signal utilized by the processor device has a frequency that is increased when the temperature reading is greater than the desired operating temperature.

4. The system of claim 3, wherein the frequency of the clock signal is decreased when the temperature measurement is less than the desired operating temperature.

5. The system of claim 3, wherein the processor device further comprises a voltage input and wherein the voltage applied to the voltage input is increased when the temperature measurement is greater than the desired operating temperature.

6. The system of claim 5, wherein the voltage applied to the voltage input is decreased when the temperature measurement is less than the desired operating temperature.

7. The system of claim 5, further comprising a lookup table containing a plurality of desired operating temperatures for the processor, each of the desired operating temperatures based on different operating characteristics associated with the processor.

8. The system of claim 7, wherein the operating characteristics include clock frequency and voltage applied to the processor.

9. A computing system comprising:
a processor device having a clock input to receive a clock signal;
an operating system that allows a user to select between a manual clock speed mode of operation and an automatic temperature-based mode of operation;
a temperature measurement device responsive to the processor device, the temperature measurement device configured to take a temperature measurement for the processor device;
control logic responsive to the temperature measurement device, the control logic to compare the temperature measurement with a desired operating temperature to determine a temperature difference; and
wherein when the computing system is in the manual clock speed mode of operation, the clock signal applied to the clock input has a substantially constant frequency and when the computing system is in the automatic temperature-based mode of operation, the clock signal applied to the clock input has a frequency that is increased based on the temperature difference of the temperature reading from the desired operating temperature if the temperature reading is greater than the desired operating temperature.

10. The computer system of claim 9, wherein the temperature measurement device takes a plurality of temperature measures and the temperature measurement is determined by taking an average of the plurality of temperature measurements.

11. The computer system of claim 9, wherein the predetermined desired operating temperature is read from a lookup table.

12. The computer system of claim 9, wherein the desired operating temperature is computed based on a plurality of factors, the plurality of factors including the current frequency, voltage, and temperature of the processor device.

13. The computer system of claim 12, wherein the desired operating temperature is modified based on environmental variations affecting the processor device.

14. A method comprising:
determining user activity for one or more processors, wherein the determining is based, at least in part, on a measured temperature that corresponds to the one or more processors; and
adjusting performance of the one or more processors in accordance with the determined user activity,
wherein the adjusting performance comprises increasing performance of the at least one of the processors if the determined user activity increases or is high.

15. An apparatus comprising:
a set of one or more processors;
a temperature sensor operable to measure temperature corresponding to the set of processors;
a store unit operable to store desired operating temperatures; and
means for increasing performance of the set of processors if a temperature measured by the temperature sensor exceeds a desired operating temperature stored in the store unit.

16. The apparatus of claim 15 further comprising means for periodically activating the temperature sensor to measure temperature.

17. A method of adjusting performance of a computer to satisfy user activity as represented by temperature, the method comprising:
measuring a temperature of the computer;
computing a difference between the measured temperature of the computer and a desired operating temperature for the computer; and
increasing performance of the computer in accordance with the computed difference if the measured temperature is greater than the desired operating temperature.

18. The method of claim 17 further comprising decreasing performance of the computer in accordance with the computed difference if the measured temperature is less than the desired operating temperature.

* * * * *